United States Patent
Saito

(10) Patent No.: US 9,098,783 B1
(45) Date of Patent: Aug. 4, 2015

(54) IMAGE READING APPARATUS AND COLOR ERASING APPARATUS

(71) Applicants: KABUSHIKI KAISHA TOSHIBA, Tokyo (JP); TOSHIBA TEC KABUSHIKI KAISHA, Tokyo (JP)

(72) Inventor: Yuichi Saito, Shizuoka-ken (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/196,960

(22) Filed: Mar. 4, 2014

(51) Int. Cl.
*G06T 5/00* (2006.01)
*G06K 15/02* (2006.01)
*G06K 15/16* (2006.01)
*G06T 7/40* (2006.01)

(52) U.S. Cl.
CPC .............. *G06K 15/027* (2013.01); *G06K 15/16* (2013.01); *G06T 7/408* (2013.01)

(58) Field of Classification Search
USPC ......... 358/1.9, 2.1, 3.26, 1.13, 505, 509, 538, 358/463, 462, 464; 347/179; 399/32, 186
See application file for complete search history.

(56) References Cited

U.S. PATENT DOCUMENTS

2011/0221852 A1*  9/2011  Yahata et al. .............. 347/179
2011/0222131 A1   9/2011  Yahata et al.

* cited by examiner

*Primary Examiner* — Jamares Q Washington
(74) *Attorney, Agent, or Firm* — Patterson & Sheridan, LLP

(57) ABSTRACT

An image reading apparatus includes a first illumination section configured to obliquely illuminate a surface of a sheet in an image reading area, a second illumination section arranged upstream of the first image reading area and configured to obliquely illuminate the surface of the sheet in the image reading area, and a reading section configured to read the surface of the sheet illuminated in the image reading area. The apparatus can switch between a two-side illumination mode in which the image reading area is illuminated by both illumination sections, and a single-side illumination mode in which the image reading area is illuminated by only one illumination section. The apparatus further includes a determination section configured to determine the state of the surface of the sheet (e.g., rip or creases) based on image data corresponding to the surface read in the single-side illumination mode.

20 Claims, 7 Drawing Sheets

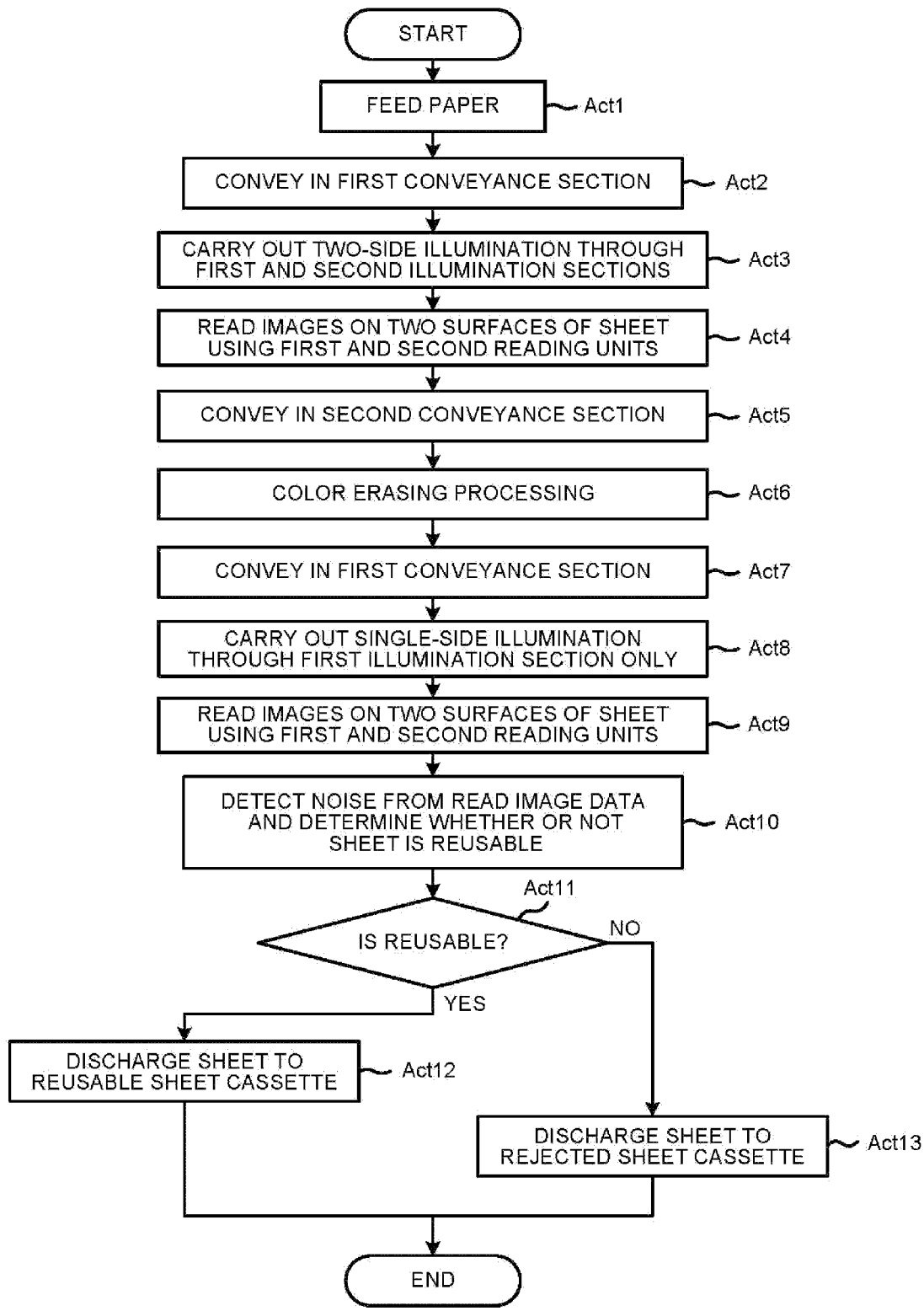

IMAGE READING APPARATUS AND COLOR ERASING APPARATUS

FIELD

Embodiments described herein relate to a technology in which flaws in appearance, such as a rip or creases and the like, are detected on a sheet on which an image is formed by an image forming apparatus.

BACKGROUND

A color erasing apparatus which erases an image on a sheet by carrying out a color erasing processing, such as heating the sheet on which the image is formed with a color erasable material to enable the color erasable material in a colored state to be in a color erased state, is known. In such a color erasing apparatus, there exists an apparatus for reading the image on the sheet before the color erasing processing and storing image data. In addition, in the color erasing apparatus, there exists an apparatus which distributes a sheet to one of the discharging destinations—a reusable sheet stacking section for stacking reusable sheets or a rejected sheet stacking section for stacking not-reusable sheets—according to a determination on whether or not an image such as characters written with a pencil or a pen remains on the sheet by reading the color erased surface of the sheet again after the image erasing processing.

The sheet placed in the color erasing apparatus for color erasing processing is a sheet which has been subjected to image forming processing, or a reusable sheet which has been subjected to the color erasing processing. Therefore, flaws in appearance and/or condition such as a rip or creases and the like possibly occur on the sheet. Such a sheet with flaws in appearance and/or condition is not suitable for later reuse.

In addition, when the image on the sheet is read by a scanner, for example, if a corner of the sheet is damaged, the damage can be recognized through the analysis on the image read in a planewise manner.

However, if the sheet is only read simply in the planewise manner, the flaws in appearance of the sheet, such as a rip, creases and the like, cannot be recognized through the analysis.

BRIEF DESCRIPTION OF THE DRAWINGS

FIG. 12 is a flowchart illustrating an operation of determining whether or not the sheet can be reused in consideration of the occurrence of the rip or the creases.

DETAILED DESCRIPTION

Embodiments described herein relate to an image reading apparatus which generally reads a surface of a sheet on a sheet conveyance path.

An image reading apparatus, according to an embodiment, includes a first illumination section configured to obliquely illuminate a surface of a sheet in an image reading area, a second illumination section arranged upstream of the first image reading area and configured to obliquely illuminate the surface of the sheet in the image reading area, and a reading section configured to read the surface of the sheet illuminated in the image reading area. The apparatus can switch between a two-side illumination mode in which the image reading area is illuminated by both illumination sections, and a single-side illumination mode in which the image reading area is illuminated by only one illumination section. The apparatus further includes a determination section configured to determine the state of the surface of the sheet (e.g., rip or creases) based on image data corresponding to the surface read in the single-side illumination mode.branchbranchHereinafter, each embodiment will be described with reference to accompanying drawings.

A First Embodiment

Figure 1:
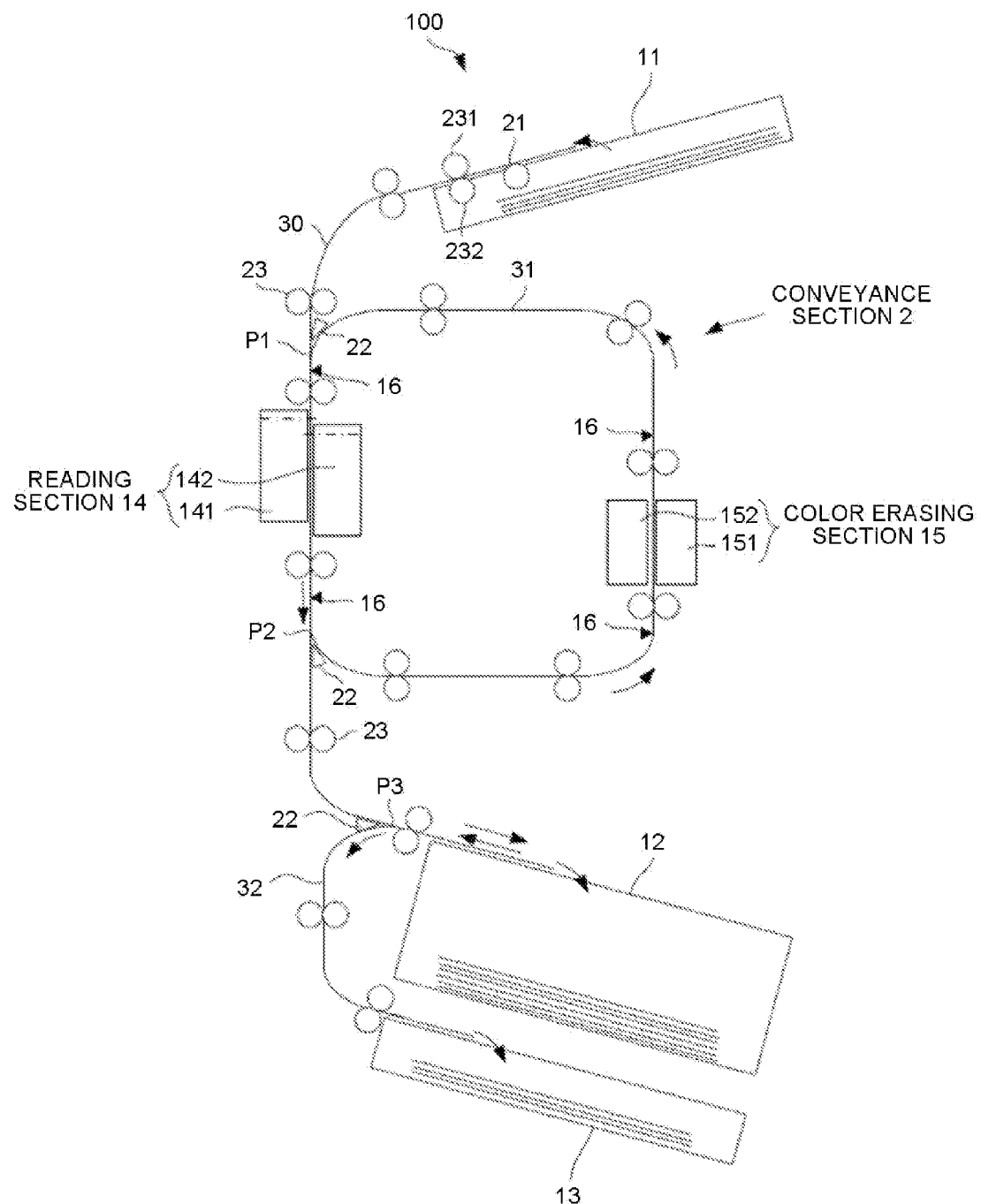
FIG. 1 is a diagram illustrating a conveyance path of a sheet in a color erasing apparatus according to a first embodiment.

FIG. 1 is a diagram illustrating a conveyance path of a sheet in a color erasing apparatus 100.

The color erasing apparatus 100 erases an image on a sheet by carrying out a color erasing processing on the sheet on which the image is formed with a color erasable material to enable the color erasable material in a colored state to be in a color erased state. In the present embodiment, the image on the sheet erased by the color erasing apparatus 100 is an image formed with a powdery color erasable toner or liquid color erasable ink which is erased by heating. In addition, in the present embodiment, the color erasing processing refers to a processing of erasing an image on a sheet by heating the sheet.

However, the color erasing apparatus may alternatively carry out a color erasing processing of erasing an image on a sheet by irradiating light such as near-infrared ray to a sheet. In this case, the image on the sheet is an image formed with a color erasable toner or a color erasable ink which is erased by irradiating light such as near-infrared ray. Such a color erasable toner or the color erasable ink, which is erased by irradiated light, for example, may be erased by a light with a wavelength of about 820 nm, but not erased by a light irradiated from a fluorescent lamp with a wavelength of about 600 nm.

The color erasing apparatus 100 comprises a paper feed cassette 11, a reusable sheet cassette 12 (reusable sheet stacking section), a rejected sheet cassette 13 (rejected sheet stacking section), a conveyance section 2, a reading section 14 including a first reading section, a second reading section (constituting the image reading apparatus), a color erasing section 15 and a sensor 16.

The paper feed cassette 11 stores a sheet on which an image is formed with a color-erasable material. The size of the sheet can be various sizes such as A4, A3, B5, LTR and the like. In addition, a sheet feed roller 231 and a separating roller 232 are paired to convey one sheet separated from a plurality of sheets to a conveyance path 311 in a condition that a pickup roller 21 conveys the plurality of sheets to the conveyance path 311 from the paper feed cassette 11.

A sheet which becomes reusable after the image thereon is erased is discharged to the reusable sheet cassette 12 from the conveyance section 2.

A sheet which is not reusable due to an image in a colored state is discharged to the rejected sheet cassette 13 from the conveyance section 2.

The reusable sheet stacking section and the rejected sheet stacking section are cassettes in the present embodiment, but may be not cassettes so long as they can stack sheets. For example, the reusable sheet stacking section and the rejected sheet stacking section may be trays, or parts arranged in the color erasing apparatus that can be accessed from outside and are capable of stacking sheets.

The conveyance section 2 comprises a first conveyance path 30, a second conveyance path 31 and a third conveyance path 33 for conveying sheets. The first conveyance path 30 is arranged between the paper feed cassette 11 and the reusable sheet cassette 12. The second conveyance path 31 branches at a branch point P2 in the first conveyance path 30, and returns to the first conveyance path 30 again at a branch point P1. The branch point P2 is arranged at the conveyance downstream side of the branch point P1. The third conveyance path 32 conveys a sheet from the conveyance downstream end of the first conveyance path 30 to the rejected sheet cassette 13 at a branch point P3.

Flappers 22 for switching the conveyance paths are respectively arranged at the branch points P1, P2 and P3.

The sheet in the paper feed cassette 11 is picked up by the pickup roller 21 and conveyed to the first conveyance path 30, and then is conveyed by a conveyance roller 23 through the branch point P1 towards the reading section 14. In addition, at the branch point P1, the flapper 22 switches such that the sheet is conveyed from the paper feed cassette 11 to the reading section 14 via the first conveyance path 30, and moreover, to avoid that the sheet is conveyed in the second conveyance path 31 from the conveyance downstream end of the second conveyance path 31 and then returns to the first conveyance path 30.

The reading section 14 comprises two reading units 141 and 142 arranged along the conveyance path 311, and an illumination section 20 which will be described later. Each of the reading units 141 and 142 may be a CIS (Contact Image Sensor), a CCD (Charge Coupled Device) image sensor, a CMOS (Complementary Metal Oxide Semiconductor) or other type of image sensor. The reading section 14 reads an image of a first surface of the sheet and an image on a second surface (i.e., the surface opposite of the first surface), namely the images on two surfaces of the sheet at once. The image data acquired by the reading section 14 is stored in a memory 43 which will be described later. In the present embodiment, by storing the image data before the color erasing processing in the memory 43, the image recorded on the sheet can be restored even after the color erasing processing, which may be convenient for users.

The color erasing section 15 is arranged between the branch point P2 and the branch point P1 along the sheet conveyance direction in the second conveyance path 31. A distance between the reading section 14 and the color erasing section 15 along the sheet conveyance direction and a distance between the color erasing section 15 and the reading section 14 are respectively longer than the length (297 mm) of along side of the sheet in A4 size (210 mm×297 mm). The color erasing section 15 comprises two color erasing units 151 and 152 arranged along the second conveyance path 31. The color erasing section 15 erases the images on the two surfaces of the sheet at once by contacting the color erasing units with the two surfaces of the sheet to heat the two surfaces. In addition, the color erasing section can further irradiate the sheet with light at the appropriate wavelength to erase the image on the sheet in a condition that the image on the sheet is formed with the color-erasable material which can be erased through the irradiation with the light.

Figure 2:
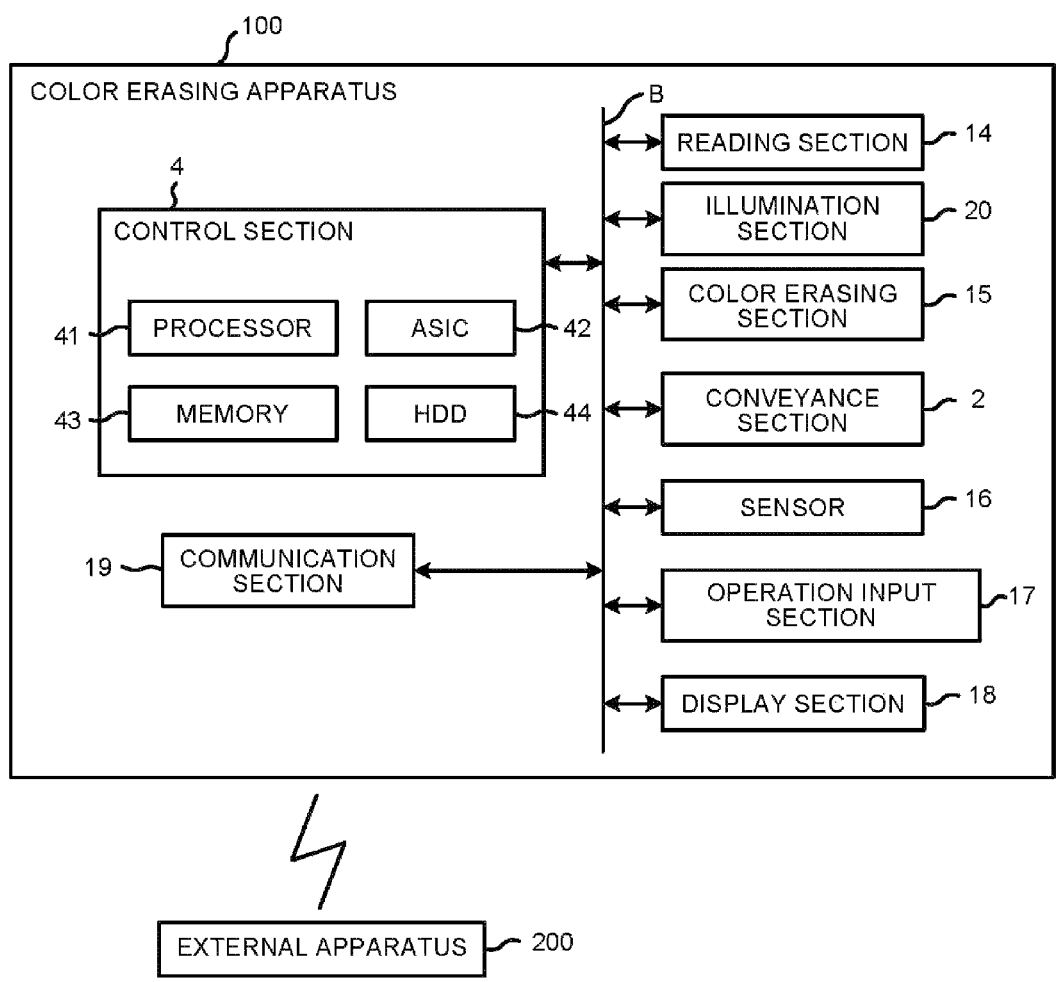
FIG. 2 is a block diagram illustrating hardware arrangement for controlling operations of the color erasing apparatus in FIG. 1.

The sheet returns to the first conveyance path 30 from the second conveyance path 31, passes through the reading section 14 for the second time, and is determined to be reusable or not by a control section 4 shown in FIG. 2 based on the read image. The determination on whether or not the sheet is reusable will be described later.

The sheet, if determined to be reusable, is discharged to the reusable sheet cassette 12 from the first conveyance path 30. Through the switching by the flapper 22 arranged at the branch point P3 at the conveyance downstream end of the first conveyance path 30, the sheet, if determined to be not-reusable, is conveyed through the switching in a switchback manner from the first conveyance path 30 to the third conveyance path 32, and is discharged to the rejected sheet cassette 13.

The sensors 16 are of contact-type or contactless-type, and moreover, are arranged at each position on the conveyance paths constituting the conveyance section 2. The sensors 16 detect the existence of the sheet. The sensors 16, for example, are arranged at front and back of the reading section 14 along the conveyance direction and at front and back of the color erasing section 15 along the conveyance direction.

FIG. 2 is a block diagram illustrating hardware arrangement of the color erasing apparatus 100.

The color erasing apparatus 100 further includes the control section 4, an operation input section 17, a display section 18 and a communication section 19 (in addition to the reading section 14, the illumination section 20 of the reading section 14, the color erasing section 15, the sensor 16 and the conveyance section 2 mentioned above). All elements 14-20, 2 and 4 are connected via a bus line B.

The control section 4 includes a processor 41, an ASIC (Application Specific Integrated Circuit) 42, the memory 43 and an HDD (Hard Disk Drive) 44. The control section 4 controls the whole color erasing apparatus 100.

The operation input section 17 includes a touch panel type display section 18 and an operation key such as a numeric key, a stop key, a start key and the like. The operation input section 17 accepts an operation input from a user.

The display section 18 displays the setting information, the operation status and the log information of the color erasing apparatus 100, and notifications to the user.

The communication section 19 is an interface connected with an external device. The communication section 19 carries out communication with an external apparatus 200 on a network in a wireless or wired manner.

The color erasing apparatus 100 reads the image on the sheet before the color erasing processing carried out on the sheet under the control of the control section 4 (first reading), and stores the read image data in the memory 43.

The color erasing apparatus 100 determines that the color erasing processing is not needed if the existence of the image on the sheet cannot be confirmed in the first reading, and conveys the sheet to the reusable sheet cassette 12 rather than conveying the sheet to the second conveyance path 31.

In addition, if color erasing processing is determined to be needed, the flapper 22 at the branch point P2 is switched such that the sheet is conveyed to the second conveyance path 31 from the first conveyance path 30.

The two surfaces of the sheet which is conveyed towards the color erasing section 15 via the second conveyance path 31 are pressurized and heated by the color erasing units 151 and 152 of the color erasing section 15 arranged oppositely to be subjected to the color erasing processing.

Figure 7:
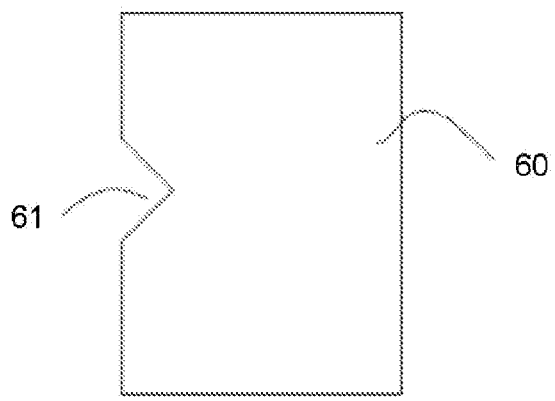
FIG. 7 is a plan view of a damaged sheet.
Figure 8:
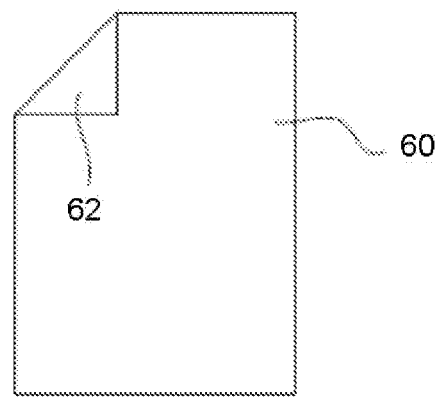
FIG. 8 is a plan view of a sheet of which a corner is folded.
Figure 9:
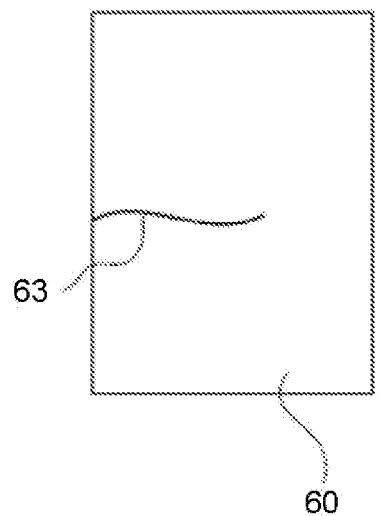
FIG. 9 is a plan view of a ripped sheet.
Figure 10:
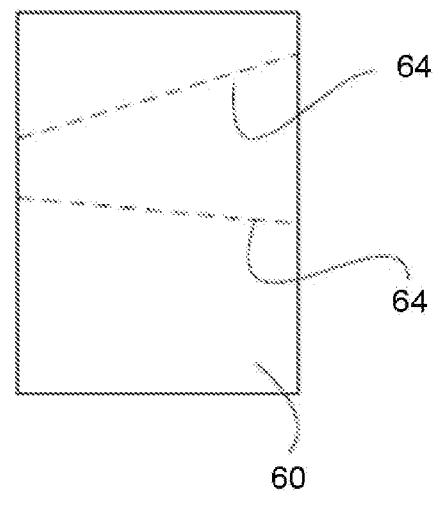
FIG. 10 is a plan view of a sheet with folds.

The sheet subjected to the color erasing processing, for example, as shown in FIG. 7-FIG. 10, may have flaws in appearance. FIG. 7 illustrates a case where a damaged section 61 where part of a sheet 60 is badly damaged is generated. FIG. 8 illustrates a case where a corner 62 of the sheet 60 is folded. FIG. 9 illustrates a case where a rip 63 occurs on one portion of the sheet 60. FIG. 10 illustrates a case where folds 64 occur on one portion of the sheet 60. The flaws in appearance in FIG. 7 and FIG. 8 can be recognized through the image processing during the first image reading since the existent portion and the inexistent portion of the sheet can be recognized clearly in a plane manner.

However, as to the flaws in appearance of the sheets 60 shown in FIG. 9 and FIG. 10, recognition of the existent portion (the entire sheet) and the inexistent portion of the sheet does not provide for recognition of such flaws. Therefore, the flaws in the sheets shown in FIG. 9, FIG. 10 and the like cannot be distinguished only through the processing on the image data acquired in the first image reading.

On the other hand, the sheet subjected to the color erasing processing is again returned to the first conveyance path 30, and is again read by the reading section 14 to carry out a determination on whether or not the image such as a character or a graph and the like written or depicted with ink or a pencil remains on the sheet 60. In addition, if the color erasing processing on the image is insufficient, an image formed with a color-erasable material that is visible to human eye may remain on the sheet.

As to the determination on whether or not the sheet can be reused based on a second read image, the detection of the read image may be exemplarily described as a detection of a portion of the image density that is different from the background color of the sheet. In such a case, it can be carried out by dividing the surface of the sheet into areas in a matrix shape and detecting whether or not a portion different from the background color of the sheet in density exists in each area.

In addition, if the color of the used color-erasable material is a specific color (for example, blue), then the insufficiency of the color erasing can be recognized by extracting the image data of the blue component in the read image.

As explained, a criteria for determining whether or not the sheet can be reused is determining whether there is a detectable noise relative to the background of the sheet. Such a detectable noise relative to the background of the sheet may be due to a color erasing residual image, an image depicted with color inerasable ink and the like, or the rip 63 or folds 64 shown in FIG. 9 and FIG. 10. However, in determining whether the sheet is reusable, detection of the noise relative to the background of the sheet is sufficient, and it is not necessary to identify a reason for the noise. This is because, namely, as long as one of the elements for determining that the sheet cannot be reused mentioned above exists, the sheet cannot be used practically.

Therefore, in the present embodiment, the rip 63 and the folds shown in FIG. 9 and FIG. 10 are considered as elements for determining whether or not the sheet can be reused.

Figure 3:
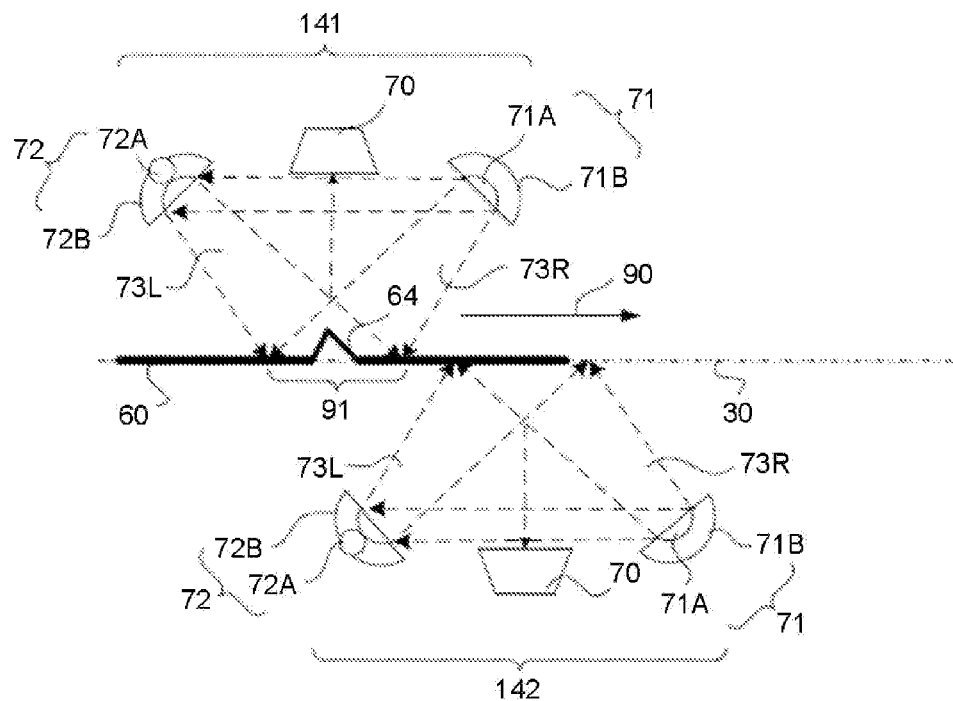
FIG. 3 is a schematic diagram of a scanner section illustrating a first image reading state of a creased sheet.
Figure 4:
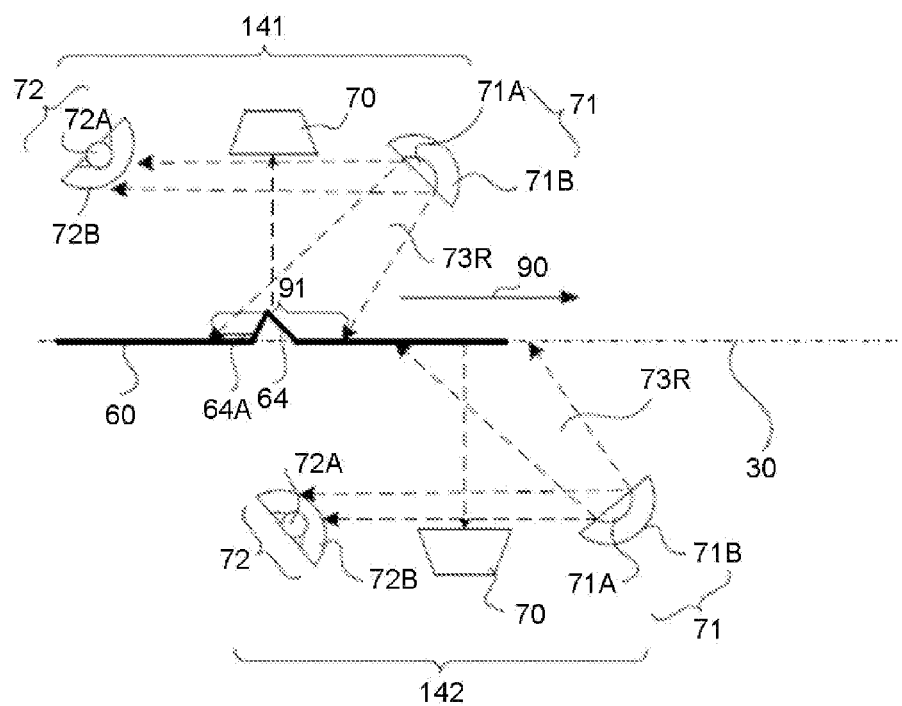
FIG. 4 is a schematic diagram of a scanner section illustrating a second image reading state of the creased sheet in FIG. 3.

In the present embodiment, arrangement of the reading section 14 is shown in FIG. 3 and FIG. 4.

The oppositely arranged first reading unit 141 and second reading unit 142 of the reading section 14 obliquely irradiate original illumination lights 73R and 73L to a sheet reading area 91 from the upstream side and the downstream side in the sheet conveyance direction shown by an arrow 90. The first and second reading units 141 and 142 have the same constitutions, and moreover, are driven in the same manner. Therefore, only the constitutions and effects of the first reading unit 141 are described and the description about the second reading unit 142 is not repeated.

A first original illumination light 73R is irradiated from a first illumination section 71, and a second original illumination light 73L is irradiated from a second illumination section 72. A reading element 70 (a CCD or the like) is arranged between the first illumination section 71 and the second illumination section 72 along the conveyance direction 90. The first illumination section 71 includes, for example, a LED string 71A for arranging a plurality of LEDs in a direction orthogonal to the sheet conveyance direction and a fixed reflector 71B for reflecting the light from the LED string 71A to the sheet reading area 91.

The second illumination section 72 comprises a rotation reflector 72B which can rotate around a support shaft 72A as a center. The rotation reflector 72B reflects the light from the LED string 71A to the sheet reading area 91 in a state that a reflecting surface faces to the sheet reading area 91. The rotation reflector 72B is driven in a reversible manner by a rotation driving mechanism (not shown).

As shown in FIG. 4, when the rotation reflector 72B is reversed from the state shown in FIG. 3 to the state shown in FIG. 4, the reflecting surface faces to an inverse side. Therefore, the original illumination is carried out only by the first illumination section 71 on the sheet reading area 91 for the sheet 60.

In the present embodiment, the illumination carried out by the first illumination section 71 and the second illumination section 72 on the sheet reading area 91 from two sides of the conveyance direction shown in FIG. 3 is executed during the first reading. Afterwards, during the second reading, as shown in FIG. 4, the rotation reflector 72B of the second illumination section 72 is reversed from an irradiation position in FIG. 3.

In the two-side illumination state shown in FIG. 3, as the folds of the sheet 60 are irradiated by the first original illumination light 73R and the second original illumination light 73L from the two sides of the conveyance direction, the ridgeline of the folds 64 cannot be recognized in the image read by the reading element 70.

On the contrary, in a single-side illumination state shown in FIG. 4, the illumination is carried out only with the first original illumination light 73R obliquely irradiated from the first illumination section 71 towards the sheet reading area 91. Therefore, a shadow 64A of the folds 64 of the sheet 60 is formed on the sheet 60. The shadow 64A is read by the reading element 70 and is recognized as a noise relative to the background color of the sheet in the data subjected to the image processing.

In such a case, it cannot be determined to be an image formed with a color material such as a color inerasable ink and the like, a residual image remaining from insufficient color erasing of the color erasable material, or folds. However, even though the specific cause of the noise relative to the background color of the sheet (i.e., the reason for determining whether or not the sheet can be reused as mentioned above) cannot be specified, so long as the existence of the noise can be confirmed, the sheet can be definitely determined to be not reusable.

Figure 5:
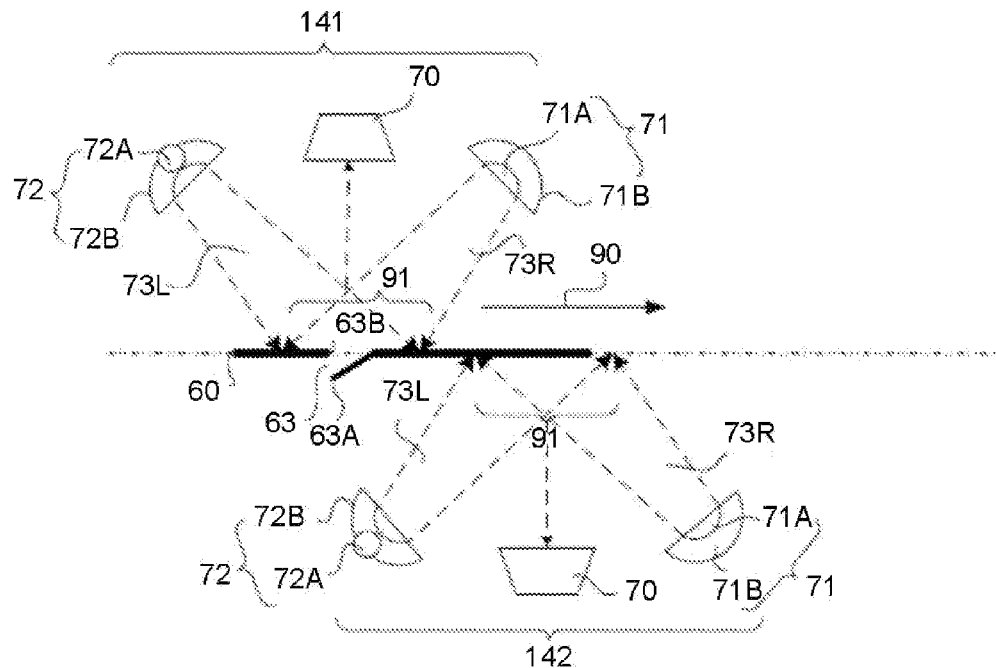
FIG. 5 is a schematic diagram of a scanner section illustrating a first image reading state of a ripped sheet.
Figure 6:
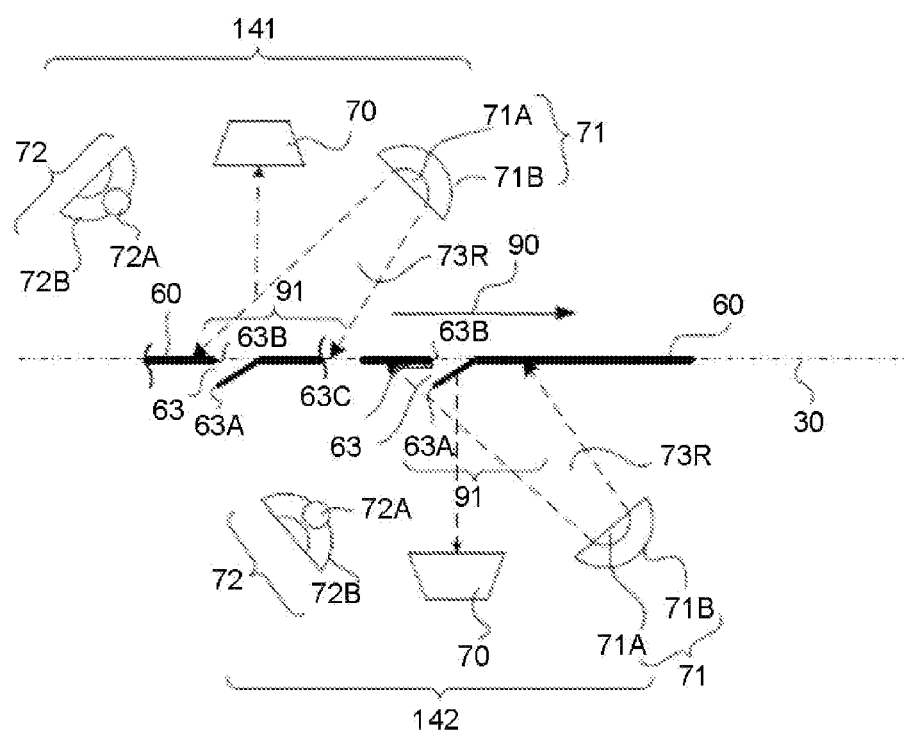
FIG. 6 is a schematic diagram of a scanner section illustrating a second image reading state of the ripped sheet in FIG. 5.

In addition, FIG. 5 and FIG. 6 are diagrams illustrating the recognition on the rip 63 of the sheet 60 shown in FIG. 9.

During the first reading shown in FIG. 5, even though end edges 63A and 63B on two sides of the rip 63 of the sheet somewhat vertically deviate, the confirmation of the rip 63 is difficult, which is the same as the condition in FIG. 3. In addition, as shown in FIG. 6, during the second reading, as one end edge 63A of the rip 63 deviates downwards than the surface of the sheet 60, the shadow of the end edge 63A of the rip 63 is not formed with the original illumination light 73R from the first illumination section 71 of the first reading unit 141.

However, a shadow 63C of the end edge 63A of the rip 63 is formed with the original illumination light 73R from the first illumination section 71 of the second reading unit 142. Therefore, the noise caused by the rip 63 can be acquired based on the image read in the second reading.

In the present embodiment, the second illumination section 72 reflects or does not reflect the illumination light from the first illumination section 71 by rotating the reflector 72B, however, the second illumination section 72 may also be provided with an illumination light source separately, like the first illumination section 71. In such a case, the ON-OFF of the illumination light source is switched instead of the operation of rotating the reflector 72B.

Figure 11:
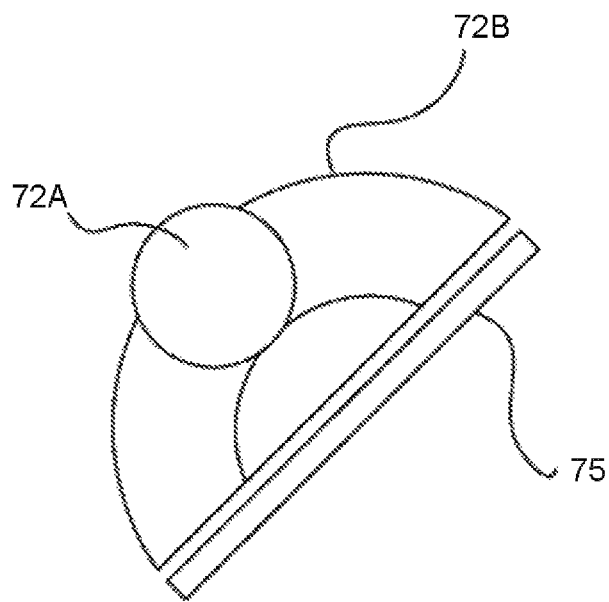
FIG. 11 is a diagram illustrating another embodiment of the illumination of a scanner section.

In addition, as shown in FIG. 11, instead of rotating the reflector 72B, a shutter 75, which is opened during the first image reading and closed during the second image reading, may also be arranged in front of the reflector 72B.

Hereinafter, operations for determining whether or not the sheet can be reused carried out by the control section 4 of the color erasing apparatus 100 are described with reference to the flowchart in FIG. 12.

In ACT1, when a start instruction on the color erasing processing from the operation input section 17 is acquired, a paper feed operation of taking one sheet out from the paper feed cassette 11 is started. Then the flow proceeds to ACT2.

In ACT2, the sheet is conveyed towards the reading section 14 in the first conveyance path 30 Then the flow proceeds to ACT3.

In ACT3, the two-side illumination is carried out by the first illumination section 71 and the second illumination section 72 of the reading units 141 and 142 on both sides. Then the flow proceeds to ACT4.

In ACT4, the images on the two surfaces of the sheet 60 are read through the reading elements 70 of the first reading unit 141 and the second reading unit 142. Then the flow proceeds to ACT5.

In ACT5, in order to convey the sheet to the color erasing section 15, the sheet is conveyed to the second conveyance path 31. Then the flow proceeds to ACT6.

In ACT6, the color erasing processing is carried out by the color erasing section 15. Then the flow proceeds to ACT7.

In ACT7, the sheet subjected to color erasing processing is merged in the first conveyance path 30 from the second conveyance path 31, and is conveyed to the reading section 14 for the second time. Then the flow proceeds to ACT8.

In ACT8, the single-side illumination is carried out only by the first illumination section 71, and then the flow proceeds to ACT9.

In ACT9, the images on the two surfaces of the sheet are read by the reading elements 70 of the first reading unit 141 and the second reading unit 142. Then the flow proceeds to ACT10.

In ACT10, the noise relative to the background color of the sheet is detected from the read image data, and whether or not the sheet can be reused is determined based on the detected noise. Then the flow proceeds to ACT11.

In ACT11, if the sheet is determined to be reusable, the flow proceeds to ACT12. If the sheet is determined to be not-reusable, the flow proceeds to ACT13.

In ACT12, the sheet which is determined to be reusable is discharged to the reusable sheet cassette 12, and then the flow ends. In ACT13, the sheet which is determined to be not-reusable is discharged to the rejected sheet cassette 13, and then the flow ends.

In accordance with the present embodiment, when a sheet is determined to be not-reusable due to a rip or folds, the sheet can be discharged to the rejected sheet cassette. In addition, sheet discharge destinations are set to be cassettes, but are not limited to this, and they can be any destination capable of stacking sheets.

In addition, during the second reading, the sheet is illuminated in the single-side illumination mode using the first illumination section 71 only, however, the sheet may also be illuminated by using the second illumination section 72 only in the single-side illumination mode.

In addition, the image reading apparatus comprising the reading section 14 is arranged in the color erasing apparatus 100, but it is not limited to this, the image reading apparatus may also be used singly, or be arranged in a MFP (Multi Functional Peripheral).

The sheet subjected to color erasing processing may also be stored in the paper feed cassette 11, and the determination on whether or not the stored color erased sheet can be reused is carried out. In such a case, as the single-side illumination mode, the sheet is conveyed to the reading section 14 from the paper feed cassette 11 in the first conveyance path 30. Afterwards, the control section 4 determines whether or not the sheet can be reused. The sheet which is determined to be reusable is conveyed to the reusable sheet cassette 12, and the sheet which is determined to be not-reusable is conveyed to the rejected sheet cassette 13. In such a case, the sheet only passes through the reading section 14 once.

In the present embodiment, a recording medium of the control section 4 may be in any form as long as the recording medium can store a program, and is readable by a computer. Specifically, as a recording medium, for example, an internal storage apparatus internally installed in a computer such as a ROM. or a RAM. and the like, a movable storage medium such as a CD-ROM or a flexible disk, a DVD disk, a magnetic optical disk, an IC card and the like, a database for storing a computer program or other computer and its database and the like can be listed. The function realized by an installed or downloaded program can also be achieved through the cooperation with an OS installed in the apparatus. One portion or all of programs may also be execution modules generated dynamically.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. An image reading apparatus comprising:
   a first illumination section arranged at a downstream side of a first image reading area in a sheet conveyance direction and configured to obliquely illuminate a first surface of a sheet in the first image reading area;
   a second illumination section arranged at an upstream side of the first image reading area in the sheet conveyance direction and configured to obliquely illuminate the first surface of the sheet in the first image reading area;

a first reading section configured to read the first surface of the sheet illuminated in the first image reading area;

an illumination switching section configured to switch between: a first two-side illumination mode in which the first image reading area is illuminated by the first illumination section and the second illumination section when the sheet is subjected to image reading in the first image reading area, and a first single-side illumination mode in which the first image reading area is illuminated by only one of the first illumination section and the second illumination section when the sheet is subjected to image reading in the first image reading area; and a determination section configured to acquire image data corresponding to the first surface of the sheet read by the first reading section in the first single-side illumination mode, identify noise relative to a background color of the sheet in the acquired image data, and determine the state of the first surface of the sheet based on the noise.

2. The image reading apparatus according to claim 1, wherein the illumination switching section switches to the first two-side illumination mode when the sheet is subjected to image reading in the first image reading area for a first time, and switches to the first single-side illumination mode when the sheet is subjected to image reading in the first image reading area for a second time.

3. The image reading apparatus according to claim 2, further comprising:

a storage section configured to store image data corresponding to the first surface of the sheet read by the first reading section.

4. The image reading apparatus according to claim 1, wherein the determined state of the first surface of the sheet is one of reusable and non-reusable.

5. The image reading apparatus according to claim 1, further comprising:

a third illumination section arranged at a downstream side of a second image reading area in the sheet conveyance direction and configured to obliquely illuminate a second surface of the sheet in the second image reading area;

a fourth illumination section arranged at an upstream side of the second image reading area in the sheet conveyance direction and configured to obliquely illuminate the second surface of the sheet in the second image reading area; and a second reading section configured to read the second surface of the sheet illuminated in the second image reading area, wherein the illumination switching section is further configured to switch between: a second two-side illumination mode in which the second image reading area is illuminated by the third illumination section and the fourth illumination section when the sheet is subjected to image reading in the second image reading area, and a second single-side illumination mode in which the second image reading area is illuminated by only one of the third illumination section and the fourth illumination section when the sheet is subjected to image reading in the second image reading area, and the determination section is further configured to acquire image data corresponding to the second surface of the sheet read by the second reading section in the second single-side illumination mode, identify noise relative to a background color of the sheet in the acquired image data, and determine the state of the second surface of the sheet based on the noise.

6. The image reading apparatus according to claim 5, wherein:

in the first single-side illumination mode, the first image reading area is illuminated by only the first illumination section, and in the second single-side illumination mode, the second image reading area is illuminated by only the third illumination section.

7. The image reading apparatus according to claim 5, wherein the determined state of the first surface of the sheet is one of reusable and non-reusable.

8. A color erasing apparatus, comprising:

a first conveyance path configured to convey a sheet from a paper feed section to a paper discharge section in a sheet conveying direction;

a second conveyance path configured to convey the sheet from a first position on the first conveyance path to a second position on the first conveyance path, wherein the second position is upstream from the first position in a sheet conveying direction;

a color erasing section arranged in the second conveyance path and configured to erase an image formed with a color-erasable material on the sheet;

a first illumination section arranged on the first conveyance path between the first position and the second position at a downstream side of a first image reading area in the sheet conveyance direction and configured to obliquely illuminate a first surface of a sheet in the image reading area;

a second illumination section arranged on the first conveyance path between the first position and the second position at an upstream side of the first image reading area in the sheet conveyance direction and obliquely illuminate the first surface of the sheet in the first image reading area;

a first reading section configured to read the first surface of the sheet illuminated in the first image reading area;

an illumination switching section configured to switch between: a first two-side illumination mode in which the first image reading area is illuminated by the first illumination section and the second illumination section when the sheet is subjected to image reading in the first image reading area, and a first single-side illumination mode in which the first image reading area is illuminated by only one of the first illumination section and the second illumination section when the sheet is subjected to image reading in the first image reading area; and a determination section configured to acquire image data corresponding to the first surface of the sheet read by the first reading section in the first singe-side illumination mode, identify noise relative to a background color of the sheet in the acquired image data, and determine the whether the first surface of the sheet is reusable based on the noise; and a paper discharge section configured to discharge a sheet determined to be reusable by the determination section to a first destination, and to discharge a sheet not determined to be reusable by the determination section to a second destination.

9. The color erasing apparatus according to claim 8, wherein the illumination switching section switches to the first two-side illumination mode when the sheet is subjected to image reading in the first image reading area for a first time, and switches to the first single-side illumination mode when the sheet is subjected to image reading in the first image reading area for a second time.

10. The color erasing apparatus according to claim 9, further comprising:
a storage section configured to store image data corresponding to the first surface of the sheet read by the first reading section.

11. The color erasing apparatus according to claim 8, wherein the sheet is determined to be non-reusable if the determination section determines that there are no residual images, folds, and rips.

12. The color erasing apparatus according to claim 8, further comprising:
a third illumination section arranged at a downstream side of a second image reading area in the sheet conveyance direction and configured to obliquely illuminate a second surface of the sheet in the second image reading area;
a fourth illumination section arranged at an upstream side of the second image reading area in the sheet conveyance direction and configured to obliquely illuminate the second surface of the sheet in the second image reading area; and
a second reading section configured to read the second surface of the sheet illuminated in the second image reading area, wherein
the illumination switching section is further configured to switch between: a second two-side illumination mode in which the second image reading area is illuminated by the third illumination section and the fourth illumination section when the sheet is subjected to image reading in the second image reading area, and a second single-side illumination mode in which the second image reading area is illuminated by only one of the third illumination section and the fourth illumination section when the sheet is subjected to image reading in the second image reading area, and
the determination section is further configured to acquire image data corresponding to the second surface of the sheet read by the second reading section in the second single-side illumination mode, identify noise relative to a background color of the sheet in the acquired image data, and determine the state of the second surface of the sheet based on the noise.

13. The color erasing apparatus according to claim 12, wherein:
in the first single-side illumination mode, the first image reading area is illuminated by only the first illumination section, and
in the second single-side illumination mode, the second image reading area is illuminated by only the third illumination section.

14. The color erasing apparatus according to claim 12, wherein the sheet is determined to be reusable if the determining unit determines that there are no residual images, folds, and rips.

15. A method of determining reusability of a sheet comprising:
obliquely illuminating a first surface of a sheet in a first image reading area with a first illumination section arranged at a downstream side of a first image reading area in a sheet conveyance direction;
obliquely illuminating the first surface of the sheet in the first image reading area with a second illumination section arranged at an upstream side of the first image reading area in the sheet conveyance direction;
reading the first surface of the sheet illuminated in the first image reading area by the first and second illumination sections in a first two-side illumination mode;
switching from the first two-side illumination mode in which the first image reading area is illuminated by the first illumination section and the second illumination section when the sheet is subjected to image reading in the first image reading area, to a first single-side illumination mode in which the first image reading area is illuminated by only one of the first illumination section and the second illumination section when the sheet is subjected to image reading in the first image reading area;
reading the first surface of the sheet illuminated in the first image reading area by only one of the first and second illumination sections in the first single-side illumination mode;
acquiring image data corresponding to the first surface of the sheet read in the first single-side illumination mode;
identifying noise relative to a background color of the sheet in the acquired image data; and
determining the state of the first surface of the sheet based on the noise.

16. The method according to claim 15, wherein
the switching from the first two-side illumination mode to the first single-side illumination mode is performed when the sheet is subjected to image reading in the first image reading area for a second time.

17. The method according to claim 15, further comprising:
storing in a storage section the image data corresponding to the first surface of the sheet read by the first reading section.

18. The method according to claim 15, wherein the determined state of the first surface of the sheet is one of reusable and non-reusable.

19. The method according to claim 18, wherein the sheet is determined to be reusable if the determining unit determines that there are no residual images, folds, and rips.

20. The method according to claim 15, wherein:
in the first single-side illumination mode, the first image reading area is illuminated by only the first illumination section, and
in the second single-side illumination mode, the second image reading area is illuminated by only the third illumination section.

* * * * *